United States Patent [19]

Murasaki et al.

[11] Patent Number: 5,393,475
[45] Date of Patent: Feb. 28, 1995

[54] METHOD AND APPARATUS FOR CONTINUOUSLY PRODUCING AN INTEGRALLY MOLDED DOUBLE-SIDED SURFACE FASTENER

[75] Inventors: Ryuichi Murasaki; Hissai Nishiyama, both of Toyama, Japan

[73] Assignee: Yoshida Kogyo K.K., Tokyo, Japan

[21] Appl. No.: 77,431

[22] Filed: Jun. 17, 1993

[30] Foreign Application Priority Data

Jun. 17, 1992 [JP] Japan ................... 4-158286

[51] Int. Cl.⁶ .............................................. B29C 59/04
[52] U.S. Cl. ................... 264/167; 156/244.15; 264/171; 264/210.2; 425/131.1; 425/327; 425/363; 425/385
[58] Field of Search ............... 264/167, 166, 172, 243, 264/171, 210.1, 210.2; 425/327, 325, 363, 385, 131.1; 24/452; 156/244.15

[56] References Cited

U.S. PATENT DOCUMENTS

| | | | |
|---|---|---|---|
| 3,551,544 | 12/1970 | Hlinka | 425/327 |
| 3,590,109 | 6/1971 | Doleman et al. | 264/167 |
| 3,594,863 | 7/1971 | Erb | 425/505 |
| 3,758,657 | 9/1973 | Menzin et al. | 264/167 |
| 3,917,772 | 11/1975 | Hollenbeck . | |
| 3,917,787 | 11/1975 | Hansen | 264/167 |
| 4,461,738 | 7/1984 | Russell | 264/166 |
| 4,725,221 | 2/1988 | Blanz . | |
| 4,872,243 | 10/1989 | Fischer | 264/167 |
| 4,999,067 | 3/1991 | Erb et al. | 264/166 |
| 5,077,870 | 1/1992 | Melbye et al. | 24/452 |
| 5,260,015 | 11/1993 | Kennedy et al. | 425/327 |

FOREIGN PATENT DOCUMENTS

| | | |
|---|---|---|
| 1551245 | 12/1968 | France . |
| 2017522 | 12/1971 | Germany . |
| 60-96418 | 5/1985 | Japan .................. 264/167 |
| PCT/US86/01367 | 11/1987 | WIPO . |

*Primary Examiner*—Jeffery R. Thurlow
*Attorney, Agent, or Firm*—Hill, Steadman & Simpson

[57] ABSTRACT

A method and an apparatus for easily producing a double-sided surface fastener molded integrally in a simple process, which provides easy disengagement in spite of high engaging strength and high durability in repetitive use. A molten resin is extruded from an extrusion nozzle at the predetermined width and is introduced into a predetermined gap between upper and lower die rollers which are disposed up and down with the gap and are provided with a plurality of engaging element forming cavities on the respective peripheries and cooling means in the inner portions. The upper and lower die rollers are concurrently driven and rotated in the extrusion direction of the molten resin while filling the engaging element forming cavities with the molten resin, so that a plurality of hook elements are continuously molded integrally on the both front and back surfaces of a plate-like base portion and are cooled to the predetermined temperature. The engaging elements of cooled resin molded article are removed from the cavities and are positively drawn out in the extrusion direction of the molten resin.

10 Claims, 2 Drawing Sheets

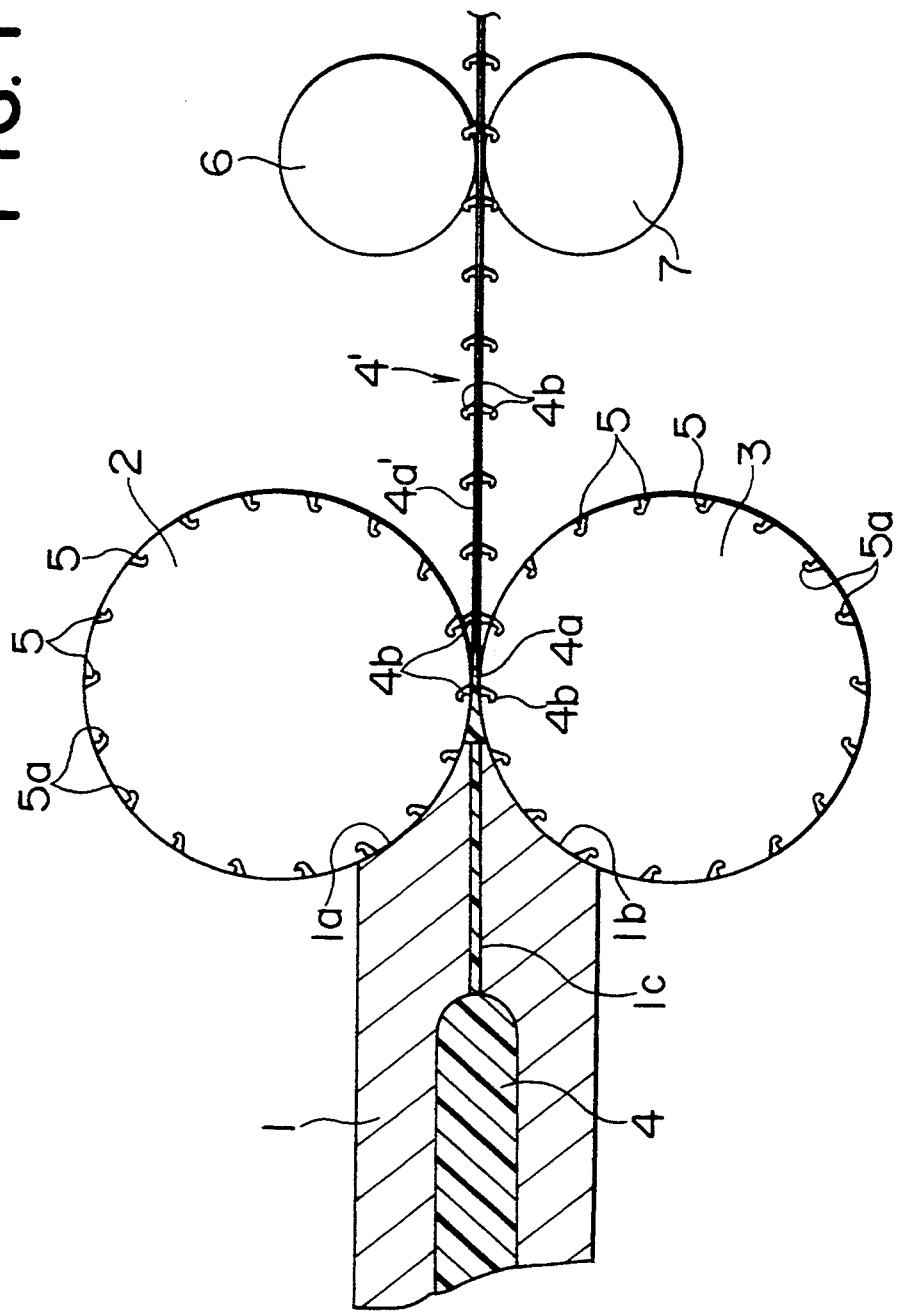

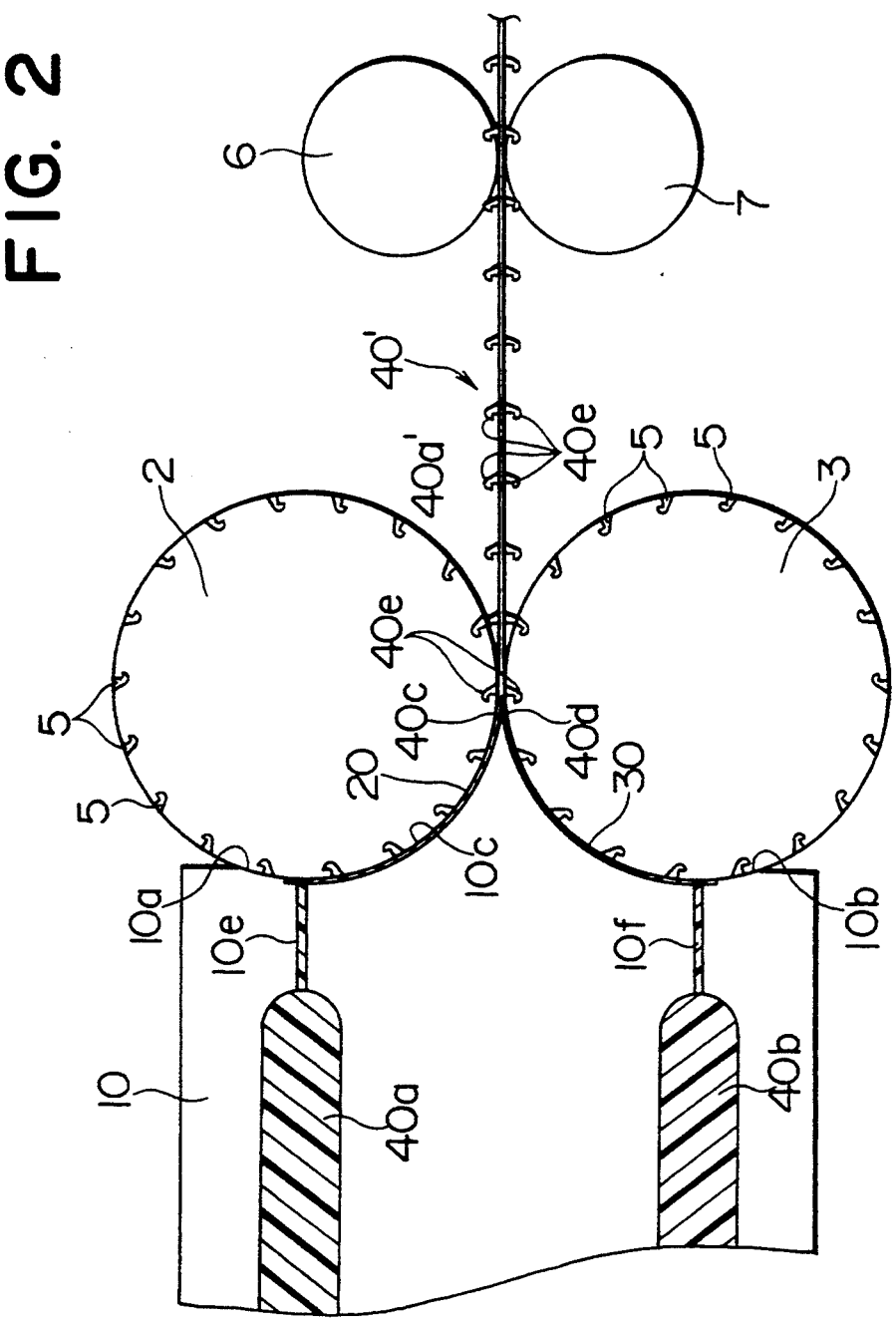

METHOD AND APPARATUS FOR CONTINUOUSLY PRODUCING AN INTEGRALLY MOLDED DOUBLE-SIDED SURFACE FASTENER

BACKGROUND OF THE INVENTION

1. Field of the Invention

This invention relates generally to a method and an apparatus for integrally molding a surface fastener having a large number of engaging elements on both front and back surfaces of a plate-like base portion continuously by extruding a thermoplastic resin and more particularly to a method and an apparatus for efficiently producing a surface fastener having a large number of engaging elements on its both surfaces.

2. Description of the Prior Art

The surface fasteners having engaging elements on both front and back surfaces of base portions are known for example in Japanese Patent Publication No. S 42-8749, Japanese Utility Model Unexamined Publication No. S 55-122612, or Japanese Patent Unexamined Publication No. H 1-238805.

With double-sided surface fastener disclosed in Japanese Patent Publication No. S 42-8749, loops are made of multi-filaments and mono-filaments respectively on front and back surfaces of a cloth by means of a loom and set under heating. Then, mono-filament loops are partially cut to provide hooks, so that loops and hooks are respectively formed on both front and back surfaces of the cloth. The loop elements and hook elements are attached to the resin coated cloth.

The surface fastener having engaging elements on both front and back surfaces disclosed in Japanese Utility Model Unexamined Publication No. S 55-122612 is provided with fibrous hook elements and loop elements on front and back surfaces of a soft tape material. But since the composition of the soft tape material is not apparent, it is not shown that how engaging elements such as hook elements and loop elements are adhered to the soft tape material. However, since the surface fastener disclosed in that Japanese Utility Model Unexamined Publication has engaging elements made of fibers also, it is supposed to be woven by the loom as well as the double-sided surface fastener disclosed in Japanese Patent Publication No. S 42-8749, or to be produced by planting individual fibers on a flexible sheet.

The surface fastener in which a base material and engaging elements are molded of synthetic resin is disclosed in Japanese Patent Unexamined Publication No. H 1-238805. FIG. 18 shows the double-sided surface fastener wherein a plurality of rows of mushroom-shaped engaging elements made of synthetic resin are formed to be protruded on one surface of a base portion, and a plurality of rows of engaging elements having ball-like heads made of the same material are formed to be protruded on the other surface of the base portion. The producing principle of the double-sided surface fastener shall be apparent from the detailed description; A row of engaging elements are molded integrally on the surface of the base portion to provide an elongated narrow tape. Then, sides of plural tapes are adhered and joined by adhesive or adhesive resin with or without a sheet-like joining member of width sufficient as a surface fastener on its back to produce the surface fastener having plural rows of engaging elements of the desired width.

Accordingly, in order to produce the surface fastener disclosed in Japanese Patent Unexamined Publication No. H 1-238805, an elongated narrow tape having a row of a large number of engaging elements protruded therefrom in the longitudinal direction is continuously or discontinuously injection-formed or press-formed. And after the required numbers of tape members are arranged laterally, the sides of the tape members are mutually adhered by the adhesive.

Thus, a textile type surface fastener disclosed in Japanese Patent Publication No. S 42-8749, is characterized in that it is soft to the touch in engagement and disengagement due to peculiar flexibility of textile and flexibility of mono-filament. Since the mono-filament which constitutes the hooks is given a drawing process, the surface fastener has high tensile strength and high bending strength even in small sectional area. Since hooks of high density are formed on account of textile composition, the surface fastener provides high engaging rate and is durable in repetitive use. But since this textile type surface fastener requires much material cost and multi-step process, it is difficult to reduce the manufacturing cost.

In case of producing double-sided surface fastener having fibrous engaging elements on both front and back surfaces of the base portion, it is impossible to impregnate only base portion with resin only by coating or spraying roots of engaging elements with resin in order to adhere and secure the roots to the base portion. It is remarkably difficult to assure the settlement of engaging elements without hardening them. In order to produce the integrally molded surface fastener disclosed in Japanese Patent Unexamined Publication No. H 1-238805, complicated processes are required, causing inefficiency and poor productivity, so that it is impossible to massproduce double-sided surface fastener having a construction shown in FIG. 18 on account of the manufacturing principle. With the surface fastener disclosed in the above-mentioned Publication, since engaging elements are formed to have mushroom-shape or anchor-shape, when the mating engaging elements are composed of loop elements, this surface fastener provides high locking force and smooth engagement without orientation. But it has defects that disengagement of the engaging elements becomes difficult due to the high locking force, and that if engaging elements are forcibly disengaged, the loop elements get broken to have poor durability in repetitive use. In case the mating engaging elements are formed to have the mushroom-shape or anchor-shape, the locking force is remarkably reduced, making the surface fastener useless.

SUMMARY OF THE INVENTION

It is therefore an object of this invention to develop a method and an apparatus for easily producing a double-sided surface fastener molded integrally in a simple process, which provides easy disengagement in spite of high engaging strength and high durability in repetitive use.

In order to assure engaging or locking force and durability, it is important to form engaging elements as hook elements on at least one surface of a base portion. In order to promote the producing efficiency and the quality of the surface fastener, it is important to integrally mold a base portion and engaging elements formed on front and back surfaces thereof simultaneously.

However, the techniques for integrally molding a base portion and engaging elements on one surface thereof simultaneously are already known for example in U.S. Pat. No. 3,312,583 and International Patent Publication WO 87/06522 (Japanese Patent Unexamined Publication No. H 1-501775).

The techniques for integrally molding single-sided surface fastener disclosed in these tablications permit a base portion and hook portions to be integrally molded by extrusion simultaneously and continuously. With this molding method, though different means for pushing a resin into hook element forming cavities is used, metal mold discs and spacer defining plates are alternately laid and secured to the multi-layer to laminate a drum. A molten thermoplastic resin is extruded onto the periphery of the rotary drum. After the molten resin is pushed into hook elements forming cavities of the metal mold disc, the resin coated onto the drum periphery is pressed to form a base portion. Then, integrally molded hook elements in the cavities are removed together with the base portion from the drum periphery in synchronization with the rotation of the drum while being cooled. The metal mold disc is provided with a plurality of hook element forming cavities which are extended from the periphery toward the center of the drum and which are formed at the predetermined intervals in the circumferential direction of the drum. The opposite sides of the spacer defining plates are formed as smooth surfaces. Herein, the spacer defining plates are required because the whole shape of the hook can not be formed as the cavity in one metal mold.

These techniques are further developed to satisfy the above-mentioned requirements in this invention.

The first aspect of this invention concerns a method for continuously producing a surface fastener molded integrally comprising the steps of, extruding a molten resin from an extrusion nozzle at predetermined width, introducing the molten resin extruded from the extrusion nozzle into a predetermined gap between upper and lower die rollers having a plurality of engaging element forming cavities on respective peripheries and cooling means in inner portions thereof, filling the molten resin in the engaging element forming cavities, concurrently rotating the upper and lower die rollers in the extrusion direction of the molten resin to mold a large number of engaging elements integrally on both front and back surfaces of the plate-like base portion continuously, cooling them to the desired temperature, and positively drawing the engaging elements of the cooled resin molded article in the extrusion direction of the molten resin while removing them from the cavities.

Being apparent from the above-mentioned fastener producing method, the desired surface fastener may be easily produced continuously in a successive single process. As the result, quality unification, better producing efficiency, and cost reduction can be achieved.

The second aspect of this invention concerns an apparatus for continuously producing a surface fastener molded integrally and provided with engaging elements on both surfaces comprising upper and lower die rollers which are disposed up and down with a desired gap therebetween and are provided with a plurality of engaging element forming cavities on respective peripheries and cooling means in inner portions thereof, a driving means for concurrently rotating the upper and lower die rollers in the travelling direction of the surface fastener, an extrusion nozzle for extruding a molten resin at a predetermined width, which is disposed on the upstream side of the rotary direction toward the gap between the upper sad lower die rollers, and upper and lower drawing rollers which are disposed on the downstream side of the rotary direction of the upper and lower die rollers and located above and below an extrusion line of the molten resin from the extrusion nozzle.

This producing apparatus has a simple construction applying principles of the conventional apparatus and the integrally molded double-sided surface fastener may be continuously produced efficiently at the high quality.

In the double-sided surface fastener molded integrally by the above-mentioned producing method, a hook element of at least on side comprises a raised portion having an inclined back surface which smoothly curves upwards from the base portion, a vertical front surface, and a reinforcing rib formed on either side of raised portion, and a hook shaped engaging portion extending forward from the front end of the raised portion. The cross-sectional area of the hook element gradually increases when going from the front end of the hook shaped engaging portion to the root of the raised portion. And the tip end of the hook-shaped engaging portion of one hook element and the end of the sloped back of an adjacent other hook element are aligned substantially along the same perpendicular line in the same hook row, or the raised portions of the hook elements of the adjacent two rows are connected by the reinforcing ribs.

Since the hook element comprises a raised portion having a vertical standing front surface and an inclined back surface, reinforcing ribs formed on sides of the raised portion, and a hook-shaped engaging portion formed in the tip end of the raised portion, wherein the sectional area of the hook element increases gradually from the tip end of the hook-shaped engaging element to the root of the raised portion, a deforming force is applied to the whole hook element without local bending of the hook-shaped engaging portion in engagement to prevent the damage of the engaging portion, and the deforming force is simultaneously accepted by the root of the raised portion to permit smooth separation. Due to the presence of reinforcing ribs, lateral bending of hook elements is prevented and a mating loop member is introduced along the inclination of the back surface of one hook element toward the engaging portion of the rearward adjacent hook element to promote the engaging rate and to increase the engaging strength.

BRIEF DESCRIPTION OF THE DRAWINGS

FIG. 1 is a vertical sectional view of an essential portion of an apparatus for producing a double-sided surface fastener molded integrally of the same raw material according to a first embodiment of this invention; and FIG. 2 is a vertical sectional view of an essential portion of an apparatus for producing a double-sided surface fastener molded integrally of different kinds or colors of raw materials according to a second embodiment of this invention.

DETAILED DESCRIPTION

Preferred embodiments of this invention will be illustrated with reference to the accompanying drawings.

FIG. 1 shows a vertical sectional view of the essential portion in manufacturing by use of an apparatus for producing double-sided surface fastener made of the same resin material according to a first embodiment of this invention. An extrusion nozzle 1 is composed of arcuate surfaces 1a, 1b having the same curvatures as a pair of upper and lower die rollers 2, 3 and a flat nozzle tip end. This extrusion nozzle 1 is composed of a T-shaped die and a molten resin 4 is extruded from an extension aperture into a sheet. According to this embodiment, the extrusion nozzle 1 has a molten resin channel 1c in a center portion thereof.

The upper and lower die rollers 2 and 3 having axes in parallel relatively are disposed up and down with a predetermined gap between the peripheries thereof in front of the extrusion nozzle 1. Respective part of the peripheries of the upper and lower die rollers are nearly contacted with the upper and lower arcuate surfaces 1a, 1b of the extrusion nozzle 1. The upper and lower die roller 2 and 3 are symmetrically arranged up and down and are provided with a plurality of hook element forming cavities 5 on respective peripheries, on which the tip end of each hook portion 5a is oriented backward (leftward in the drawing).

Since the other structure of the upper and lower die rollers has substantially the same construction as those disclosed in WO 87/06522, the other structure will be simply illustrated herein. The each die roller comprises a hollow drum which has a water cooling jacket in the inner portion and which includes a plurality of cavity-defining plate assembly in the central portion along its axis. The plate assembly includes an alternating series of ring-shaped engraved plates and substantially flat backing plates defining cavities 5 together, within which hook elements of the surface fastener are formed. The upper and lower die rollers 2, 3 are rotated in the reverse direction toward the extrusion direction of the extrusion nozzle 1 by a concurrent driving device which is not shown in the drawings, as disclosed in the aforementioned International Patent Publication. A pair of upper and lower drawing rollers 6, 7 are disposed ahead of the upper and lower die rollers 2, 3 (in the right of the drawing) and are also concurrently rotated in the travelling direction of the surface fastener.

The surface fastener of this invention may be made of thermoplastic resins such as nylon, polyester, polypropylene plastic materials. In forming, the temperature and extrusion pressure of the molten resin and the temperature and rotary velocity of the die rollers may be properly adjusted according to the plastic resin materials.

According to this apparatus of the aforementioned construction, a molten resin 4 extruded from an extrusion nozzle 1 is pushed into a gap between a concurrenty rotating upper and lower die rollers 2 and 3, and a part of the molten resin fills the hook element forming cavities 5 in order, so that a plate-like base portion 4a having desired thickness and width can be continuously press-formed between the upper and lower die rollers 2, 3 while forming hook elements 4b on the plate-like base portion.

In this forming, the molten resin 4 is contacted with the upper and lower die rollers 2 and 3 and is cooled by cooling means set in the inner portion of these rollers, thereby to be gradually hardened. During this hardening, when a base portion 4a is drawn off under a proper tension in the extrusion direction, as soon as individual hook elements 4b are smoothly removed from the upper and lower cavities 5 while they are linearly elastic-deformed, they are restored-to the original shapes and naturally cooled at the peripheral temperature to be hardened.

In this embodiment, a molded article (double-sided surface fastener 4' are withdrawn from the upper and lower die rollers 2, 3 by use of a pair of upper and lower drawing rollers 6, 7 which are concurrently rotated in the travelling direction of the surface fastener. These upper and lower drawing rollers 6 and 7 have usually smooth peripheries, but these rollers are preferably provided with grooves for accommodating hook elements 4b in circumferential portions to prevent the hook elements 4b from being damaged when they pass through these rollers. The rotating speed of the drawing rollers 6, 7 are set at a slightly higher speed than the rotating speed of the upper and lower die rollers 2, 3 to draw off the hook elements 4b smoothly from the hook element forming cavities 5.

FIG. 2 is a vertical sectional view of the essential portion in manufacturing a double-sided surface fastener by using different kinds or colours of materials on front and back surfaces according to a second embodiment of this invention, and the same components as the first embodiment are also provided with the same reference numbers.

In this drawing, an extrusion nozzle 10 is provided with upper and lower acute surfaces in a tip end thereof and the nozzle tip end is protruded at the actual angle. First arcuate surfaces 10a, 10b in the upper and lower end sides have respectively the same curvature to the upper and lower die rollers 2, 3 and second arcuate surfaces 10c, 10d in the central sides have respectively larger curvature by predetermined value than the upper and lower die rollers 2, 3. The extrusion nozzle 10 comprises a T-shaped die having two molten resin channels 10e, 10f which are respectively opened toward the upper and lower second arcuate surfaces 10c, 10d. Different kinds or colors of molten resins 40a, 40b are respectively extruded from upper and lower extrusion openings of the channels 10e, 10f.

The upper and lower die rollers 2 and 3 are respectively disposed up and down and are rotated about respective parallel axis. These rollers are partially nearly contacted with the first arcuate surfaces 10a, 10b formed in the upper and lower end portions of the extrusion nozzle 10 and are arranged with predetermined intervals to the second arcuate surfaces 10c, 10d.

Conseqently, spaces 20, 30 having predetermined interval dimention are formed between the second arcuate surfaces 10c, 10d formed in the central portions of the extrusion nozzle 10 and the peripheries of the upper and lower die rollers 2, 3. The upper and lower die rollers 2, 3 have the same symmetrical arrangement as the first embodiment. A plurality of hook element forming cavities 5 of which tip ends 5a of hook elements are oriented rearward (leftward in the drawing), are formed on respective peripheries of these die rollers 2, 3. Since the other configuration of the upper and lower die rollers 2, 3 are substantially provided with the same configuration as the first embodiment, its illustration are omitted herein. A pair of drawing rollers 6, 7 are disposed in the downstream side of upper and lower die rollers 2, 3, as well as the first embodiment. In molding, the temperature and extrusion pressure of each molten resin and the temperature and rotating speed of each die roller and the like may be properly adjusted according to the resin material.

According to the second embodiment, individual molten resins 40a, 40b extruded from an extrusion nozzle 10 are respectively introduced into spaces 20, 30 formed between the extrusion nozzle 10 and the upper and lower diw rollers 2, 3. Individual base portions 40c, 40d are respectively transferred to the gap between the upper and lower die rollers 2, 3 while filling hook element forming cavities 5 formed in the peripheries of these die rollers with molten resin. Then, the base portions 40c and 40d are joined in the gap and pressed between the upper and lower die rollers 2, 3 to be mutually welded together. The hook elements 4e are simultaneously molded in the cavities 5 integrally with the base portions.

In this molding, molten resins 40a, 40b are contacted with upper and lower die rollers and are cooled by cooling means set in the inner portions of these die rollers to be gradually hardened. During this hardening, when the base portions 40c, 40d are drawn off under proper tensions in the extrusion direction, as soon as individual hook elements 40e are smoothly removed from the upper and lower cavities 5 while they are elastic-deformed linearly, they are restored to the original shapes and are naturally cooled at the peripheral temperature to be hardened. Of course, a double-sided surface fastener 40' is cooled between the upper and lower die rollers 2, 3 and the drawing rollers 6, 7 by use of cooling means such as cooling wind sprayer and the like, so that it may be positively cooled and hardened.

As mentioned above, the double-sided surface fastener member 4', 40' has a large number of hook elements 40e molded integrally on both front and back surfaces of the base portions 4a', 40a'. A plurality of rows of book elements 40e are formed on the both front and back surfaces of the base portions 4a', 40a', and the hook elements 40e of the same row are oriented in the same direction. The adjacent rows of hook elements are oriented in the opposite directions. As the result, a surface fastener without the orientation in the engaging strength can be produced.

The hook configuration according to this embodiment has a shape of a wave on the beach and is composed of an raised portion standing up directly from the front and back surfaces of the base portion 4a', 40a' and a downward hook-shaped engaging portion formed in the tip end of the raised portion.

The inclined back surface of the raised portion in the opposite side relative to the side on which hook-shaped engaging portion is formed smoothly curves upwards, standing up from the surface of the base portion 1. The front surface of the raised portion on the side of the hook-shaped engaging portion stands up generally vertically through a radius from the surface of the base portions 4a', 40a'. The whole shape of the raised portion is spread downward, and reinforcing ribs are formed on sides of the raised portion integrally with the base portion 4a', 40a'. The shape of each reinforcing rib may be properly determined, however, the typical shape has substantially the same width along the height direction, or the width of the rib is gradually decreased upwardly from the base portion 4a', 40a' as looking from the front side of the hook.

The hook-shaped engaging portion is formed on the upper end of the raised portion, continuing from respective tangents of the front and back surfaces of the raised portion to have a space for engagement. The hook-shaped engaging portion is designed to be slightly tapered. As the result, the sectional area of the hook element increases gradually from the tip end of the hook-shaped engaging portion to the root of the raised portion.

According to the hook configuration, when the loop elements or mating engaging elements (not shown) are pushed on the hook elements 4b in order to engage the surface fastener with the other mating surface fastener, the loop elements are put in the slant back surface side of the raised portion and along the upper surface of the front side of the tip end of the hook-shaped engaging portion of the hook elements 4b. The loop element guided along the back surface of the hook element is engaged with the hook-shaped engaging portion of the other mating hook element adjacent to the back surface and the loop element guided toward the tip end of the hook-shaped engaging portion is engaged with the engaging portion so that the engaging rate improves remarkably. Due to the presence of the reinforcing ribs, the lateral bending is prevented when the loop element are pushed against the hook elements 4b and the engaging rate with the loop element does not decrease even in the repetitive use.

On one hand, when the surface fastener is separated from the mating surface fastener, the loop element is smoothly disengaged from the hook element, because the hook-shaped engaging portion has a tapered configuration so that its flexibility becomes larger as it goes toward the tip end of the engaging portion. Due to the sectional configuration of the raised portion, even when excessive separating force is applied to the hook-shaped engaging portion, the force is surely accepted by the root, and the raised portion is wholly deformed in the perpendicular direction, so that the loop element is rapidly disengaged from the hook element.

In the first and second embodiments, the engaging elements are formed as hook elements on the both front and back surfaces of the base portion. But according to this invention, the engaging elements are formed as the book elements on at least one surface of the base portion and do not always have to be formed as the hook elements on the both front and back surfaces. For example, the hook elements are formed on the front surface and V-shaped elements are formed on the back surface of the base material which perform anchoring function.

According to this configuration, when the double-sided surface fastener produced in this invention is used to secure a double-sided loop matting onto a carpet, hook elements are engaged with loop elements of the matting and anchor-shaped elements are inserted into the carpet to secure the double-sided loop matting to the carpet.

In the second embodiment of this invention, different kinds or colours of resin materials are respectively extruded from two molten resin channels and the upper and lower base portions are joined and welded in the gap between the upper and lower the rollers. But, some kind of materials have poor adhesion. In such case, one resin channel is disposed in the middle position between the two molten resin channels to extrude a molten resin having chemical affinity with these two resin materials of different kind, and the molten resin is sandwiched between the upper and lower base portions to thereby improve the welding performance of the different resin materials.

According to this invention as stated in detail, the integrally molded double-sided surface fastener may be easily and continuously produced in a single process without complicated processes. This apparatus has a simple construction and a high flexibility to produce the double-sided surface fastener efficiently.

Moreover, since it is possible to specify the hook configuration on the double-sided surface fastener as desired, the engaging rate with the mating loop material is improved. At the same time, smooth disengagement of the loop material in separating is also achieved. Since the resistant force is accepted by not only a part of the hook element but whole part of the hook element, the engaging portion is not damaged. When the reinforcing ribs are formed, the surface fastener is durable in the repetitive use and provides easy engagement and disengagement. It may be smooth to the touch as well as the knitting type surface fastener. The surface fastener may be broadly used in the industrial material field as well as the other various fields such as daily necessaries and the like.

When raised portions of adjacent rows of hook elements are connected through reinforcing ribs, it is possible to decrease the thickness of the hook element since the strength of the hook element is reinforced by the ribs. As the result, the hook element is further easily inserted into the mating loop material and the density of the hook elements can be increased, to assure sufficient strength, and to provide flexible performance as well as the knitting type surface fastener.

What is claimed is:

1. A method for continuously producing an integrally molded double-sided surface fastener having a plate-like base portion with integrally molded engaging elements on a front and back surface thereof, comprising the steps of:
    extruding a molten resin from an extrusion nozzle at a predetermined width,
    introducing said molten resin extruded from said extrusion nozzle into a predetermined gap between upper and lower die rollers having a plurality of engaging element forming cavities on respective peripheries and cooling means in inner portions thereof and filling said molten resin in said cavities for said engaging elements,
    concurrently driving said upper and lower die rollers in opposite rotary directions having tangent velocity directions at said gap in the extrusion direction of said molten resin to mold a plate-like base portion having a plurality of engaging elements integrally on both front and back surfaces thereof continuously and cooling said elements to a predetermined temperature, and
    positively removing said engaging elements of said cooled resin molded articles from said cavities in the extrusion direction of said molten resin.

2. A method for continuously producing an integrally molded double-sided surface fastener according to claim 1, wherein said each engaging element has a hook-shape on at least one of both front and back surfaces of said base portion.

3. A method for continuously producing an integrally molded double-sided surface fastener according to claim 1, including continuously molding same resin materials by use of one extrusion channel of said molten resin.

4. A method for continuously producing an integrally molded double-sided surface fastener according to claim 1, including continuously molding different resin materials by use of more than two extrusion channels of said molten resin.

5. A method for continuously producing an integrally molded double-sided surface fastener according to claim 4, including supplying a resin material of high chemical affinity with two different resin materials into a middle resin channel by use of three extrusion channels.

6. An apparatus for continuously producing an integrally molded double-sided surface fastener comprising:
    an upper die roller and a lower die roller which are disposed up and down with a predetermined gap therebetween and which are respectively provided with a plurality of engaging element forming cavities on respective peripheries and cooling means located within the upper and lower rollers,
    a driving means for concurrently rotating said upper and lower die rollers in opposite rotary directions having tangent velocity directions at said gap in a travelling direction of said surface fastener,
    an extrusion nozzle for extruding a molten resin at a predetermined width, which is disposed on the upstream side of said upper and lower die rollers toward said gap, and
    upper and lower drawing rollers which are disposed on the downstream side of said upper and lower die rollers and along an extrusion line of the molten resin extruded from said extrusion nozzle.

7. An apparatus for continuously producing an integrally molded double-sided surface fastener according to claim 6, wherein engaging element forming cavities on at least one periphery of said upper and lower die rollers are formed to have a hook-shape.

8. An apparatus for continuously producing an integrally molded double-sided surface fastener according to claim 6, wherein said extrusion nozzle has a molten resin channel. different resin materials.

9. An apparatus for continuously producing an integrally molded double-sided surface fastener according to claim 6, wherein said extrusion nozzle has two or more molten resin channels for extruding different resin materials.

10. An apparatus for continuously producing an integrally molded double-sided surface fastener according to claim 9, wherein said extrusion nozzle has three molten resin channels, and a middle channel is used as a channel for supplying a resin material of high chemical affinity with said different two resin materials.

* * * * *

UNITED STATES PATENT AND TRADEMARK OFFICE
CERTIFICATE OF CORRECTION

PATENT NO. : 5,393,475
DATED : February 28, 1995
INVENTOR(S) : Ryuichi Murasaki and Hissai Nishiyama It is certified that error appears in the above-identified patent and that said Letters Patent is hereby corrected as shown below:

At column 10, line 42, please delete "different resin materials."

Signed and Sealed this

Third Day of September, 1996

Attest:

BRUCE LEHMAN

Attesting Officer     Commissioner of Patents and Trademarks